Feb. 2, 1932.  E. L. CHAPMAN  1,843,866
TOOL FOR INSTALLING BRAKE SPRINGS
Filed July 22, 1930
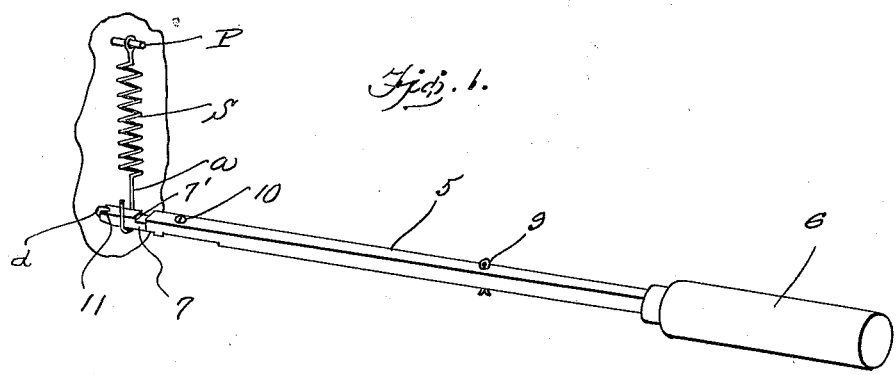
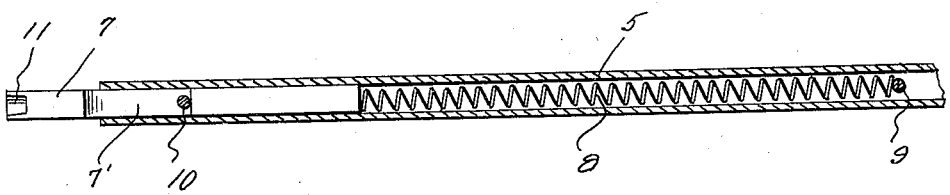
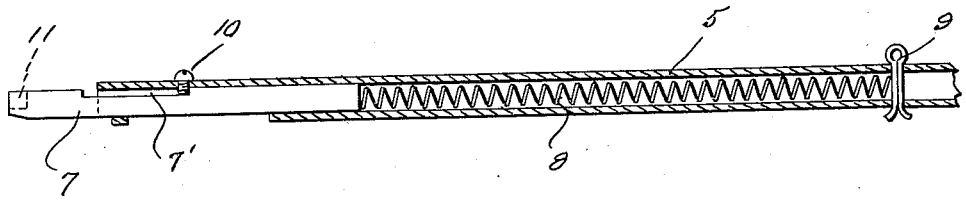
Inventor
*E. L. Chapman*
By *Clarence A O'Brien*
Attorney Patented Feb. 2, 1932

1,843,866

UNITED STATES PATENT OFFICE

EDWARD L. CHAPMAN, OF TULSA, OKLAHOMA

TOOL FOR INSTALLING BRAKE SPRINGS

Application filed July 22, 1930. Serial No. 469,768.

This invention relates to tools especially adapted for installing springs within the brake housing of automobile brakes.

A primary object of this invention is to provide a tool of the character above mentioned, which is comparatively simple in construction, may readily at one end be inserted into the brake housing through the opening provided therefor whereby one end of the tool may be engaged with the free end of the brake spring for engaging the said end of the spring to the dial pin.

Other objects and advantages of the invention will become apparent during a study of the following description, taken in connection with the accompanying drawings, wherein:

Figure 1 is a perspective view of the tool, showing the application of the same, Figure 2 is a horizontal longitudinal sectional view taken through the tool, Figure 3 is a vertical longitudinal sectional view therethrough.

With reference more in detail to the drawings, it will be seen that the tool comprises a hollow shank 5 that is equipped at one end with a suitable grip or handle 6. The spring engaging member 7 is slidable within the shank 5, and one end of the member 7 is adapted to project outwardly of the shank under action of a suitable coil spring 8. The spring 8 has one end thereof suitably anchored within the shank 5 through the medium of a suitable anchoring pin 9. The pin 9 may be in the nature of a cotter-pin.

The spring engaging member 7 on the top thereof is provided with a longitudinally extending guide notch 7'. A screw 10 is threaded through the shank 5 adjacent the free end of the shank and the inner end of the screw extends into the notch 7'. Obviously, the inner end of the screw 10 engaging the inner end of the notch 7' will limit the outward movement of the member 7 under action of the spring 8.

The member 7 at its outer end is provided with a notch 11 for accommodating the dial pin of the vehicle brake.

In using the device, it will be seen that the projected end of the member 7 will project through a suitable opening provided therefor in the wall of the brake drum. The said end of the member 7 within the drum may be suitably manipulated to engage the hook end $a$ of the brake spring S which is suspended in the brake drum from the pin P. The projected end of the member 7 thus engaging the hook end $a$ of the spring S may then upon suitable manipulation of the tool be so arranged as to receive notch 11 and the dial pin $d$ with which the hook end $a$ of the spring is to be engaged. When the parts therefore are in the position shown in Figure 1, it will be seen that by pressing or pushing inwardly on the handle 6, the shank 5 will move longitudinally relative to the member 7 and the outer free end of the shank will engage the hook end $a$ of the spring S urging the hook end $a$ toward the dial pin $d$, to finally transfer the hook end $a$ from the end of the member 7 onto the dial pin $d$.

When the end $a$ reaches the pin $d$, the tool may then be readily removed from the brake drum.

From the foregoing then it will be seen that I have provided a neat and economical tool for use in "hooking up" spring brake drums of automobiles, tractors, aeroplanes and the like.

Even though I have herein shown and described the preferred embodiment of my invention, it is to be understood that the same is susceptible to changes fully comprehended by the spirit of the invention, the scope of the appended claim.

Having thus described my invention, what I claim as new is:

A tool for engaging the hook end of a brake spring to its dial pin, comprising a shank, a member mounted in the shank and constrained to slide longitudinally of the shank, spring means normally projecting one end of the member outwardly beyond the corresponding end of said shank, said member at said one end being provided with a notch for accommodating the dial pin, and said member at said last mentioned end adapted to be engaged with the hook end of the spring to aline said end of the spring with the dial pin to subsequently transfer said hook end on to the dial pin when said shank is shifted longitudinally of said member in a direction toward the dial pin.

In testimony whereof I affix my signature.

EDWARD L. CHAPMAN.